US007378614B2

(12) United States Patent
Lee

(10) Patent No.: US 7,378,614 B2
(45) Date of Patent: May 27, 2008

(54) HEAT ROD ASSEMBLY AND PRE-HEATER FOR VEHICLES INCLUDING THE SAME

(75) Inventor: Sung-Young Lee, Seoul (KR)

(73) Assignee: Woory Industrial Company Ltd. (KR)

( * ) Notice: Subject to any disclaimer, the term of this patent is extended or adjusted under 35 U.S.C. 154(b) by 92 days.

(21) Appl. No.: 10/579,840

(22) PCT Filed: Aug. 3, 2004

(86) PCT No.: PCT/KR2004/001951

§ 371 (c)(1),
(2), (4) Date: May 17, 2006

(87) PCT Pub. No.: WO2005/049349

PCT Pub. Date: Jun. 2, 2005

(65) Prior Publication Data

US 2007/0045274 A1 Mar. 1, 2007

(30) Foreign Application Priority Data

Nov. 18, 2003 (KR) ...................... 10-2003-0081466

(51) Int. Cl.
*B60L 1/02* (2006.01)

(52) U.S. Cl. ...................... 219/202; 219/537; 219/539; 219/540

(58) Field of Classification Search ................ 219/202, 219/520, 534, 537, 505, 539, 540, 544
See application file for complete search history.

(56) References Cited

U.S. PATENT DOCUMENTS 6,462,317 B1 * 10/2002 Foote et al. ................ 219/505
7,098,426 B2 * 8/2006 Bohlender et al. .......... 219/202

FOREIGN PATENT DOCUMENTS

| | | | |
|---|---|---|---|
| JP | 02-53628 | A | 2/1990 |
| KR | 20-0144945 | | 11/1998 |
| KR | 20-0235499 | Y1 | 10/2001 |
| KR | 10-2001-0110621 | A | 12/2001 |
| KR | 10-2003-0047809 | A | 6/2003 |

* cited by examiner

*Primary Examiner*—Leonid M. Fastovsky
*Assistant Examiner*—Vinod D Patel
(74) *Attorney, Agent, or Firm*—Needle & Rosenberg, P.C.

(57) ABSTRACT

A heat rod assembly for preheating internal air of a vehicle by using heat generated from a positive temperature coefficient (PCT) device and a pre-heater for vehicles including the same, in which components of the heat rod assembly and the pre-heater are grouped as module units so that a width and a volume of the heat rod assembly or the pre-heater can be variously formed so that the heat rod assembly or the pre-heater is adaptable for various kinds of vehicles.

11 Claims, 7 Drawing Sheets

(a)

(b)

[Fig. 1]
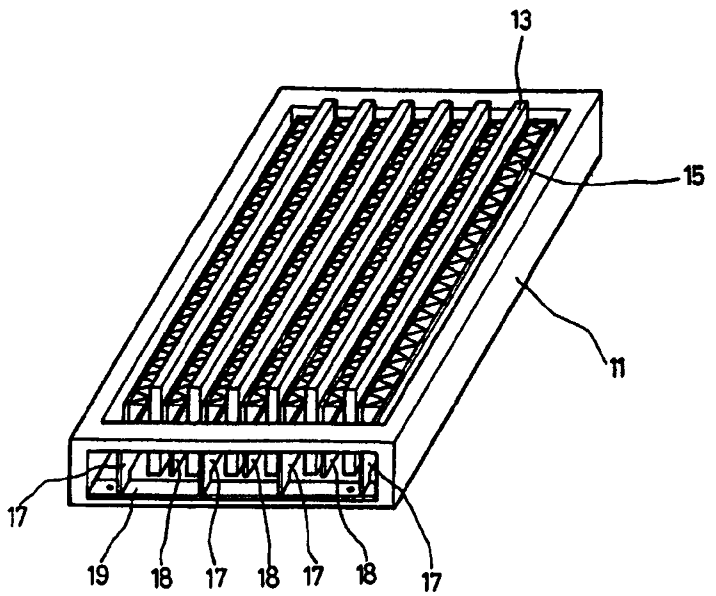
(a)
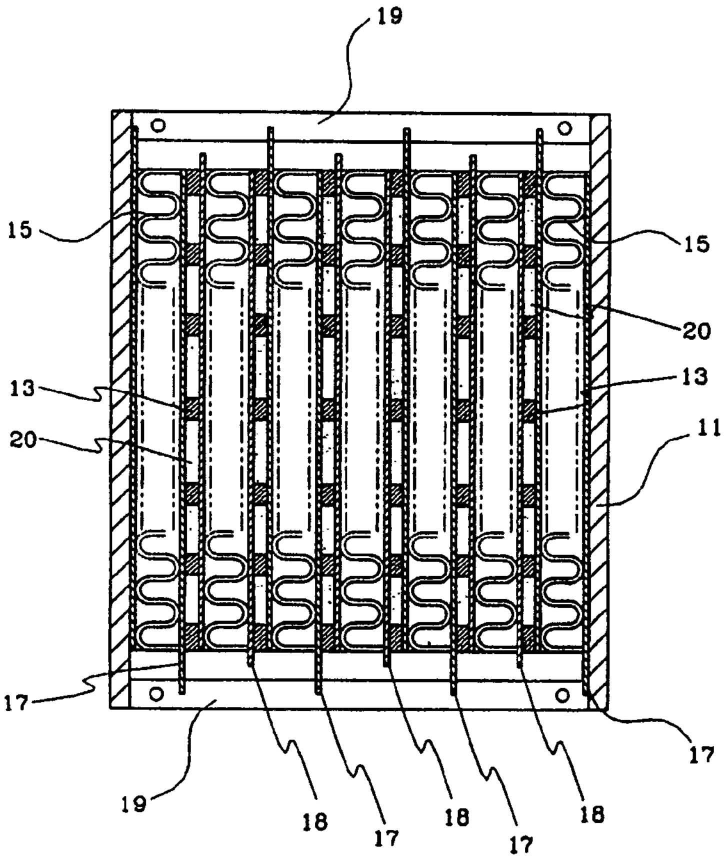
(b)

[Fig. 2]
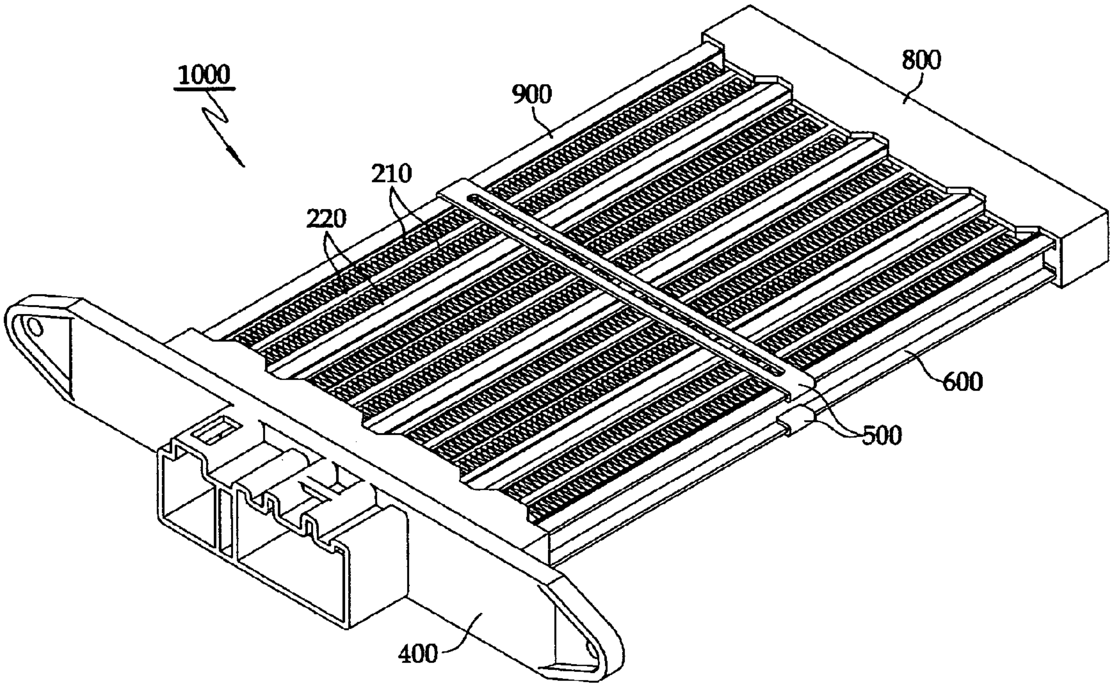
[Fig. 3]
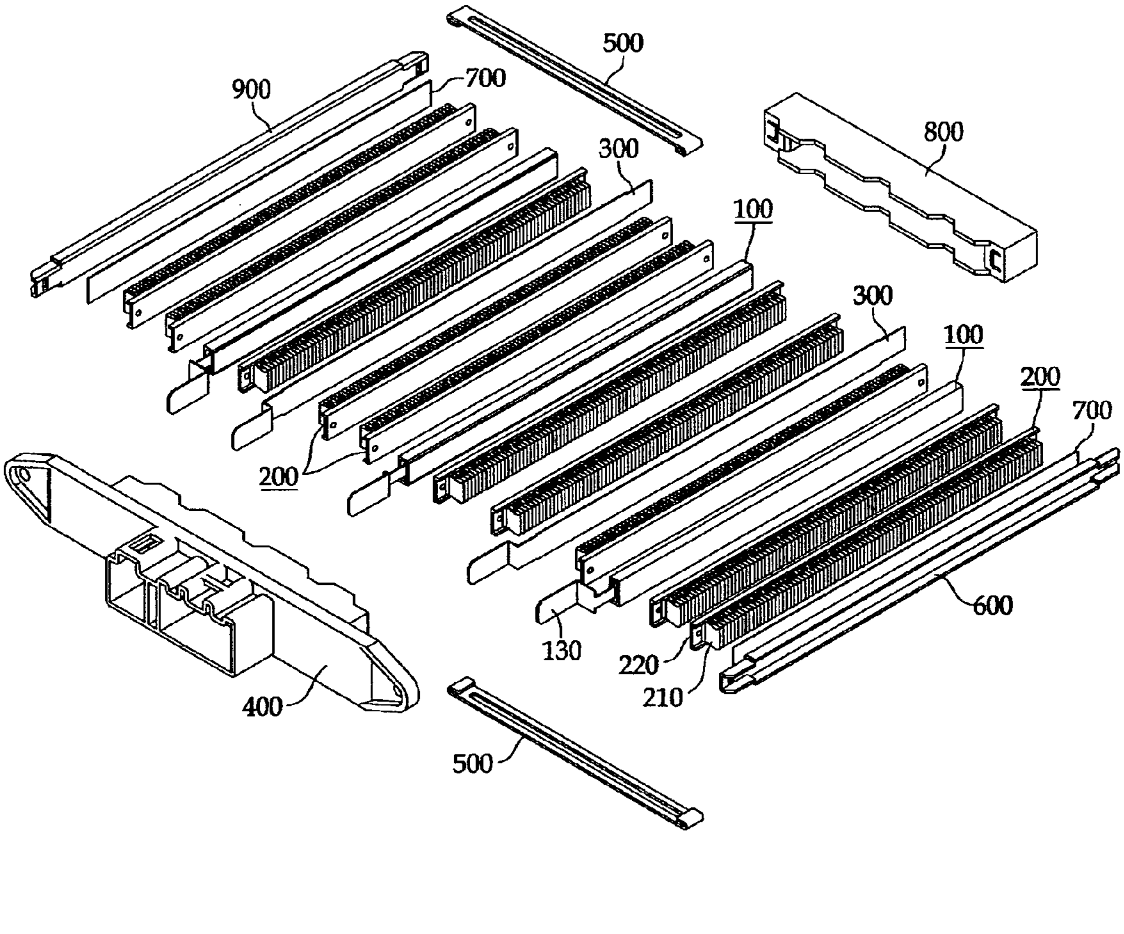

[Fig. 4]
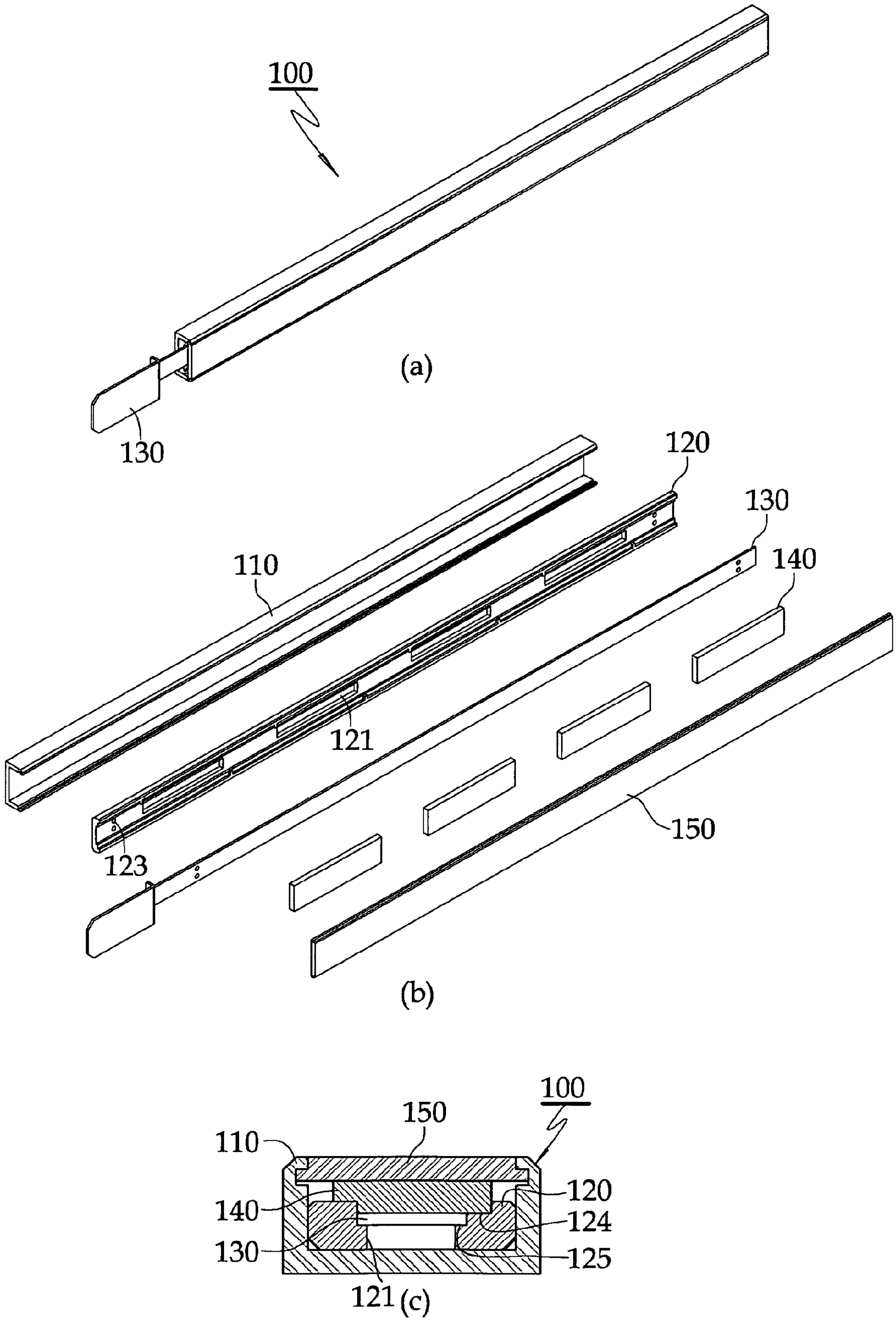

[Fig. 5]
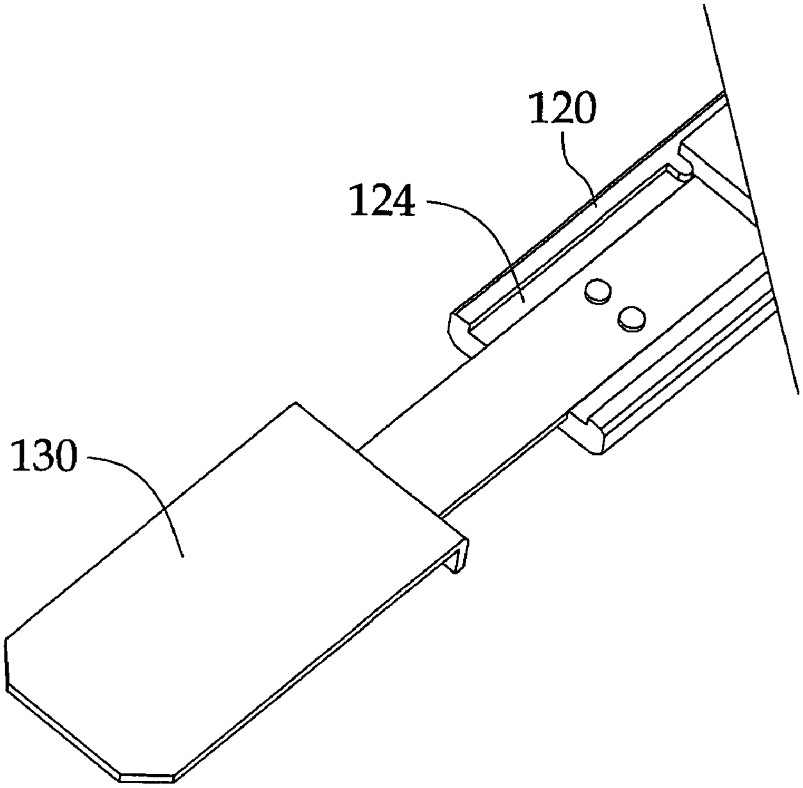
[Fig. 6]
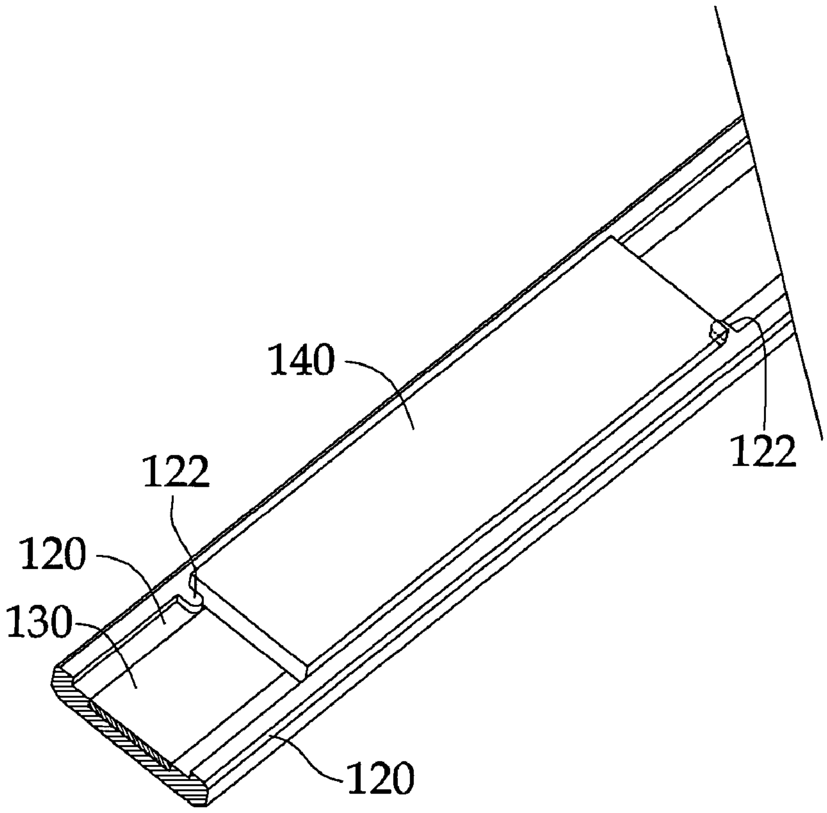

[Fig. 7]
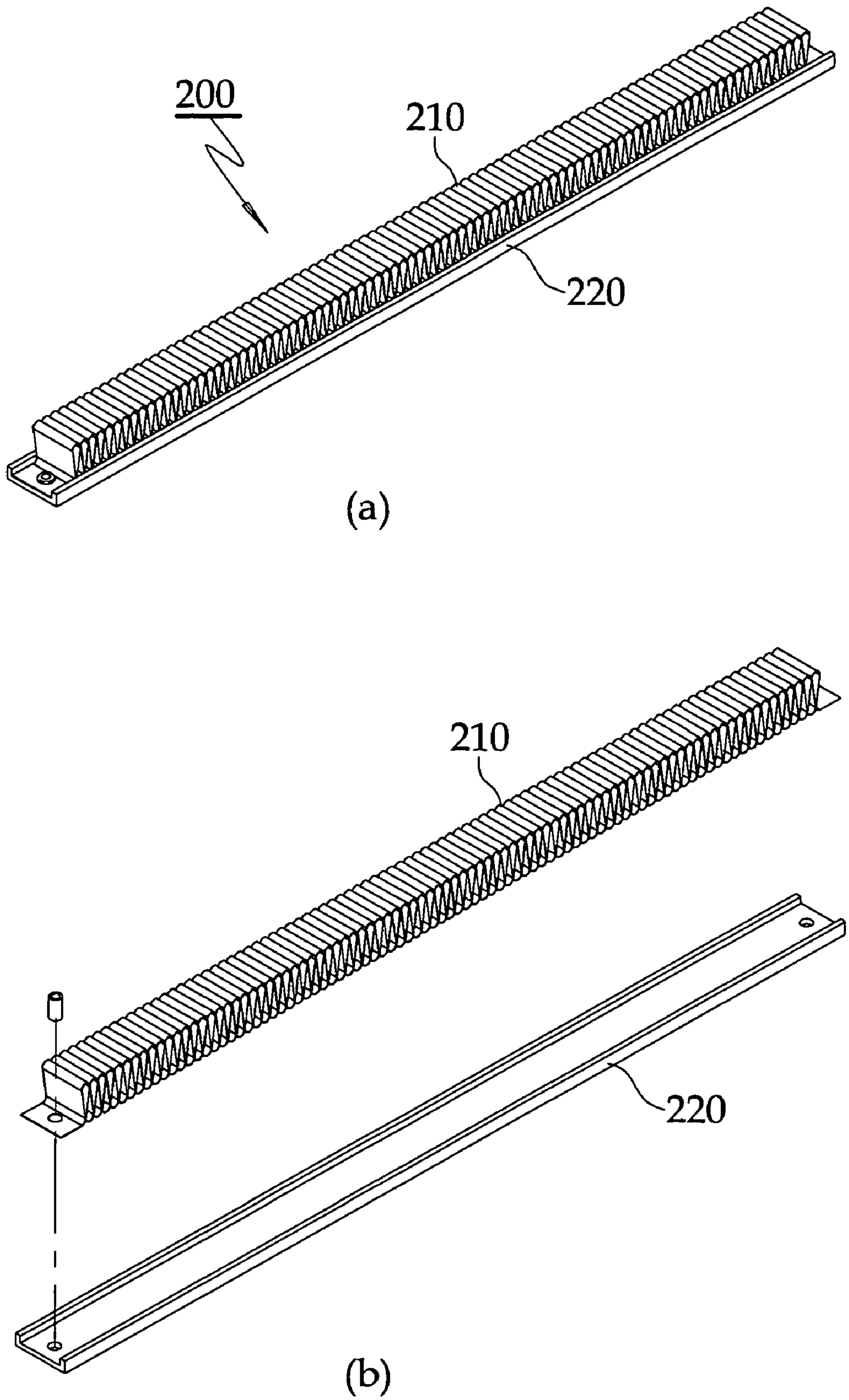

[Fig. 8]
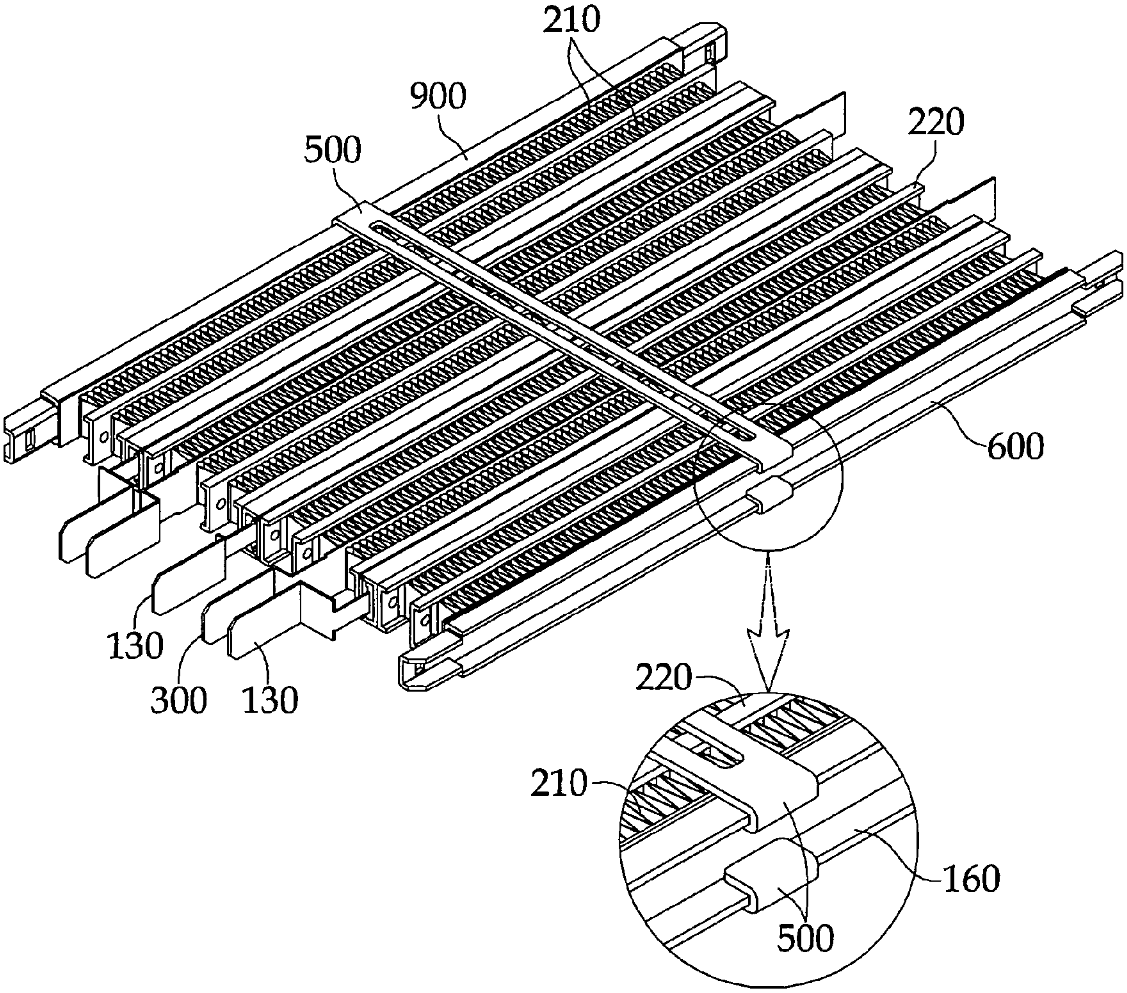

[Fig. 9]
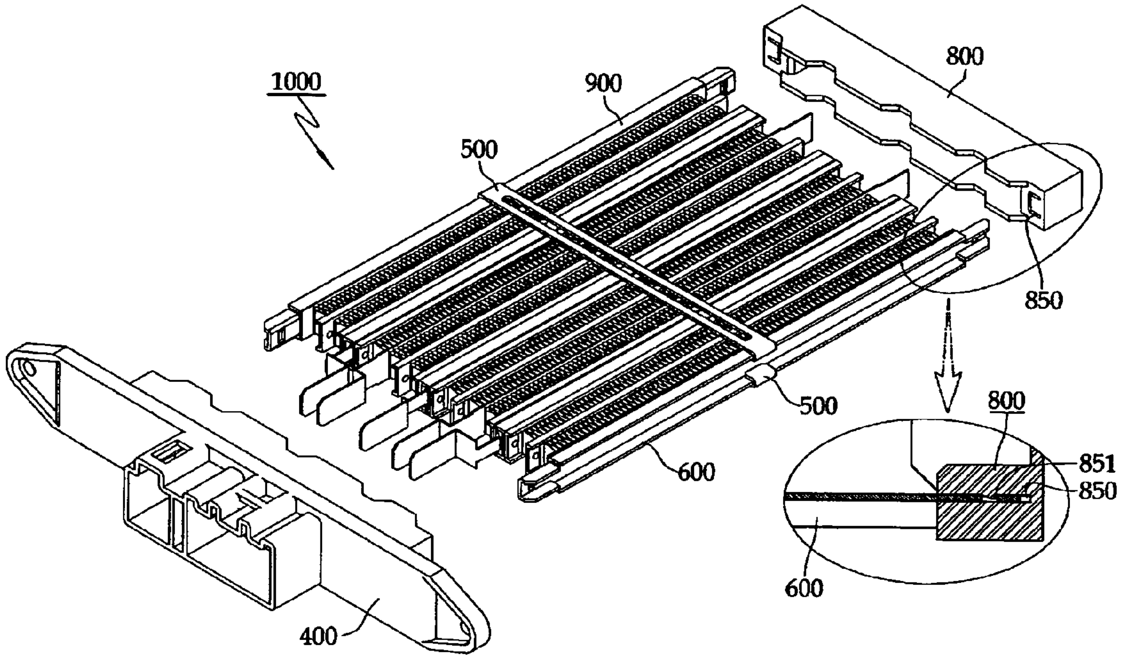
[Fig. 10]
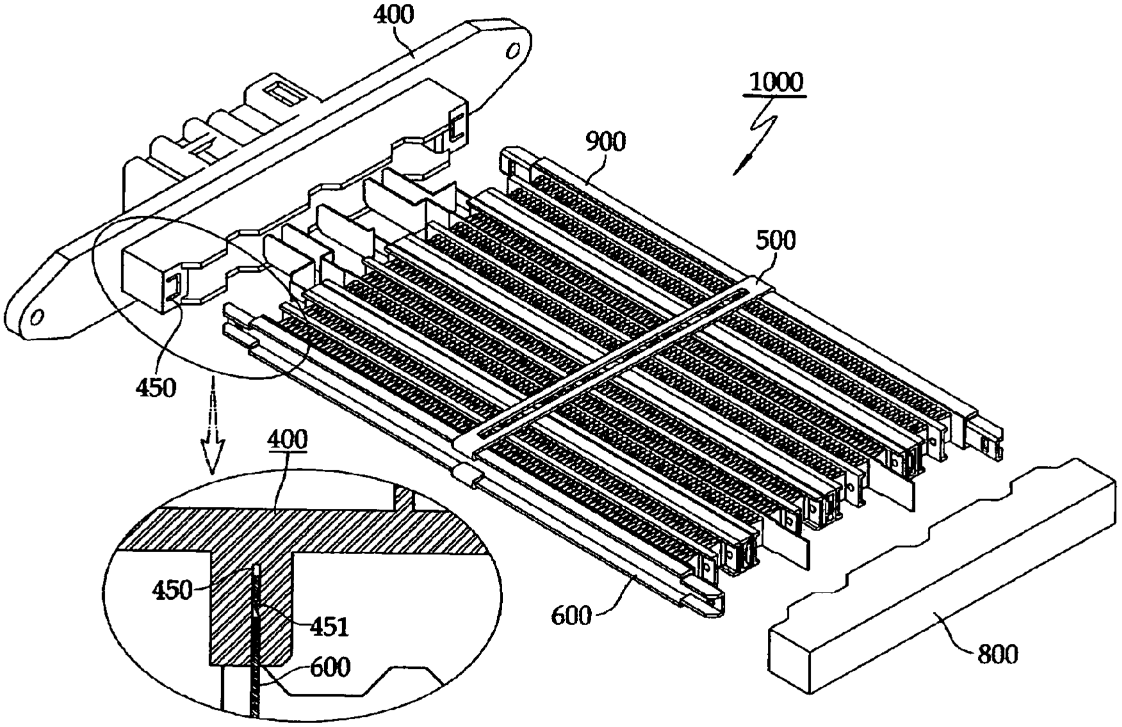

HEAT ROD ASSEMBLY AND PRE-HEATER FOR VEHICLES INCLUDING THE SAME

CROSS REFERENCE TO RELATED APPLICATIONS

The present application claims priority to Korean Patent Application No. 10-2003-0081466, filed Nov. 18, 2003, which application is incorporated herein fully by this reference.

TECHNICAL FIELD

The present invention relates to a heat assembly and a pre-heater for vehicles including the same, and more particularly to a heat assembly for preheating internal air of a vehicle by using heat generated from a PTC device and a pre-heater for vehicles including the same.

BACKGROUND ART

Generally, a vehicle is equipped with a heating device for heating internal air of the vehicle or for removing humidity or frost from a front window of the vehicle by using thermal energy of cooling water, which is heated by heat generated from an engine.

In such a heating device, cooling water flowing around the engine is heated by heat generated from the engine after the engine has been operated and is introduced into the heating device, so relatively long time is necessary to sufficiently heat internal air of the vehicle. For this reason, in a cold season, a driver must wait for a predetermined time in the vehicle while being exposed to the cold after starting the vehicle.

In order to solve the above problem, Korean Utility Model Registration No. 20-0144945 discloses a heating device for preheating internal air of a vehicle by using a PTC (positive temperature coefficient) device. Hereafter, a structure of the heating device disclosed in Korean Utility Model Registration No. 20-0144945 will be shortly described.

As shown in FIG. 1, the heating device for a vehicle includes a plurality of PTC devices 20, which generate heat upon receiving power from a power source. A plurality of anti-short receiving plates 13 having perforated holes for receiving the PTC devices 20 are installed in a frame 11 in parallel to each other. In addition, a plurality of heat sinks 15 are installed between the anti-short receiving plates 13 such that heat exchange is easily achieved between the anti-short receiving plates 13. First terminals of the PTC devices (for example, negative terminals) are connected to the power source, and second terminals of the PTC devices (for example, positive terminals) are connected to the power source through switches (not shown), which are individually operated.

In addition, plates 17 and 18 are aligned between the anti-short receiving plates 13 and the heat sinks 15. The anti-short receiving plates 13 have heights larger than heights of the heat sinks 15 and the plates 17 and 18 in such a manner that the PTC devices 20 are prevented from being shorted due to impurities attached thereto.

Herein, reference numeral 19 represents terminal plates, which are installed at lower front and lower rear portions the frame 11, respectively. One end of the plate 17 is connected to the terminal plate, thereby forming the negative terminal together with the frame 11. In addition, one end of the plate 18 is connected to a wire (not shown), thereby forming the positive terminal.

However, the conventional heating device for the vehicle having the above construction represents a problem. That is, since components of the conventional heating device are not divided as module units, assembling work for the components of the conventional heating device is very complicated, thereby lowering productivity and workability.

DISCLOSURE OF THE INVENTION

Therefore, the present invention has been made in view of the above-mentioned problems, and it is an object of the present invention to provide a heat rod assembly and a pre-heater for vehicles including the same, in which components of the heat rod assembly and the pre-heater are grouped as module units so that a width and a volume of the heat rod assembly or the pre-heater can be variously formed so that the heat rod assembly or the pre-heater is adaptable for various kinds of vehicles, and assembling work for the components can be easily and simply carried out so that productivity thereof can be improved.

In order to accomplish the above object, according to one aspect of the present invention, there is provided a heat rod assembly for a pre-heater used in a vehicle, the heat rod assembly comprising: a channel type lower heat rod; an insulator installed at a bottom portion of the lower heat rod; a positive terminal fixedly installed on the insulator lengthwise along the insulator; a PTC device coupled to the insulator by interposing the positive terminal therebetween; and an upper heat rod for covering an opening section of the lower heat rod.

According to the preferred embodiment of the present invention, an upper edge section of the lower heat rod is inwardly bent such that the upper edge section covers an edge section of the upper heat rod.

According to the preferred embodiment of the present invention, an inner width of the lower heat rod is identical to an outer width of the insulator such that the lower heat rod is securely accommodated in the insulator.

According to the preferred embodiment of the present invention, the insulator is formed with a bottom recess, which extends lengthwise along the insulator in order to receive the positive terminal therein. The insulator is provided at both longitudinal ends thereof with fixing protrusions, which are inserted into coupling holes formed in the positive terminal.

According to the preferred embodiment of the present invention, stepped recesses are formed at both sides of the bottom recess of the insulator, insertion protrusions are formed in the stepped recesses, and a distance between the insertion protrusions is identical to a length of the PTC device.

According to the preferred embodiment of the present invention, the PTC device is positioned on the insulator corresponding to openings formed in the insulator by interposing the positive terminal between the PTC device and the insulator.

According to another aspect of the present invention, there is provided a pre-heater for a vehicle, the pre-heater comprising: a heat rod assembly having the above construction; a heat pin assembly formed at both sides of the heat rod assembly in parallel to each other; a negative terminal aligned in parallel to the heat pin assembly; side frames coupled to both sides of a coupling structure consisting of the heat rod assembly, the heat pin assembly and the negative terminal; and housings for coupling the heat rod assembly, the heat pin assembly, the negative terminal, and the frames with each other at front and rear portions thereof.

According to the preferred embodiment of the present invention, a coupling unit is laterally provided over middle parts of the heat rod assembly, the heat pin assembly and the negative terminal in order to couple the heat rod assembly, the heat pin assembly and the negative terminal with each other.

According to the preferred embodiment of the present invention, the coupling unit includes a clip capable of coupling the heat rod assembly, the heat pin assembly and the negative terminal with the side frames.

According to the preferred embodiment of the present invention, the side frames have a channel structure, both ends of the clip are bent such that the both ends of the clip are locked with flanges formed in upper portions of the side frames, and the housings have coupling slots, respectively, for receiving end portions of the side frames.

According to the preferred embodiment of the present invention, the heat pin assembly includes a plurality of corrugate pins, which are fixedly arranged lengthwise along a pin plate.

According to the preferred embodiment of the present invention, the heat pin assembly is coupled with the side frames by interposing a pin protecting plate therebetween.

DESCRIPTION OF DRAWINGS

The foregoing and other objects, features and advantages of the present invention will become more apparent from the following detailed description when taken in conjunction with the accompanying drawings in which:

FIG. 1 illustrates a structure of a conventional pre-heater for a vehicle, in which (a) is a perspective view of the conventional pre-heater and (b) is a plan view of the conventional pre-heater;

FIG. 2 is a perspective view showing a pre-heater for a vehicle according to one embodiment of the present invention;

FIG. 3 is an exploded perspective view of a pre-heater for a vehicle according to one embodiment of the present invention;

FIG. 4 illustrates a heat rod assembly provided in a pre-heater according to the present invention, in which (a) is a perspective view of the heat rod assembly, (b) is an exploded perspective view of the heat rod assembly, and (c) is a cross-sectional view of the heat rod assembly;

FIG. 5 is a perspective view showing a positive terminal coupled with an insulator;

FIG. 6 is a perspective view showing a PTC device coupled with an insulator;

FIG. 7 illustrates a structure of a heat pin assembly shown in FIG. 3, in which (a) is a perspective view of the heat pin assembly and (b) is an exploded perspective view of the heat pin assembly;

FIG. 8 shows a perspective view of a coupling structure of a clip and a frame shown in FIG. 3, and a partially enlarged view thereof;

FIG. 9 shows a perspective view of a coupling structure of a rear housing shown in FIG. 3, and a partially enlarged view thereof; and FIG. 10 shows a perspective view of a coupling structure of a front housing shown in FIG. 3, and a partially enlarged view thereof.

BEST MODE

Reference will now be made in detail to the preferred embodiments of the present invention with reference to accompanying drawings.

In the following description of the present invention, a detailed description of known functions and configurations incorporated herein will be omitted when it may make the subject matter of the present invention rather unclear.

FIGS. 2 and 3 show a structure of a pre-heater 1000 for a vehicle according to one embodiment of the present invention.

As shown in FIGS. 2 and 3, the pre-heater 1000 of the present invention includes heat rod assemblies 100 including PTC devices, heat pin assemblies 200 formed at both sides of the heat rod assemblies 100 in parallel to each other, negative terminals 300 aligned in parallel to the heat pin assemblies 200, side frames 600 and 900 coupled to both sides of a coupling structure consisting of the heat rod assemblies 100, the heat pin assemblies 200 and the negative terminals 300, and housings 400 and 800 for coupling the heat rod assemblies 100, the heat pin assemblies 200, the negative terminals 300, and the frames 600 and 900 with each other at front and rear portions thereof.

Hereinafter, components of the pre-heater for the vehicle will be described in detail.

FIG. 4 shows a structure of the heat rod assembly 100.

As shown in FIG. 4, the heat rod assembly 100 includes a lower heat rod 110, which is formed with a channel structure so that the lower heat rod 110 acts as a receiving part.

An insulator 120 is installed at a bottom of the lower heat rod 110 so as to prevent current leakage. To this end, an outer width of the insulator 120 matches with an inner width of the lower heat rod 110 so that the insulator 120 is securely a accommodated in the lower heat rod 110. In addition, the insulator 120 includes nonconductive material, such as nylon, and material having superior thermal conductivity.

As shown in FIG. 5 in detail, a positive terminal 124 made from carbon steel is fixedly coupled with the insulator 120 lengthwise along the insulator 120. To this end, the insulator 120 is formed at a bottom thereof with a bottom recess 125 for receiving the positive terminal 130 having a relatively thin thickness. In addition, as shown in FIG. 4, a pair of protrusions 123 is formed at both sides of the bottom recess 125 in order to securely accommodate the positive terminal 130 in the bottom recess 125. Preferably, the positive terminal 130 is formed with coupling holes, into which the protrusions 123 are inserted. One end of the positive terminal 130 extends to an exterior so as to be connected with a power source (not shown), such as a battery.

In addition, as shown in FIGS. 4(*c*) and 6, the PTC device 140, which generates heat when power is applied thereto, is installed on the insulator 120 by interposing the positive terminal 130 therebetween. To this end, stepped recesses 124 are formed at both sides of the bottom recess 125 and insertion protrusions 122 can be formed at front and rear portions of the stepped recesses 124. In order to allow the PTC device 140 to be rested on the insulator 120, a distance between the insertion protrusions 122 matches with a length of the PTC device 140. Preferably, the insertion protrusions 122 are slantingly formed. In addition, it is also possible to provide the insertion protrusions 122 corresponding to four edges of the insulator 120.

The insulator 120 is formed at a bottom thereof with a plurality of openings 121 such that heat generated from the PTC device 140 can be easily transferred to the exterior.

Preferably, the PTC device 140 is installed corresponding to the openings 121 of the insulator 120.

An opening section of the lower heat rod 110 is closed by means of an upper heat rod 150. In order to fabricate the heat rod assembly 100 as one module, it is necessary to securely couple the upper heat rod 150 with the lower heat rod 110. Thus, as shown in FIG. 4(*c*), a protrusion is formed at an inner upper portion of a flange of the lower heat rod 110. After placing the upper heat rod 150 on the protrusion, an upper end of the flange is bent through a swaging process so that the heat rod assembly 100 is fabricated as one module.

In addition, as shown in FIG. 7, the heat pin assembly 200 includes a plurality of corrugate pins 210, which are fixedly arranged lengthwise along a pin plate 220. The corrugate pins 210 and the pin plate 220 are made from material having light weight and superior thermal conductivity, such as aluminum.

Meanwhile, although the heat rod assembly 100, the heat pin assembly 200, and the negative terminal 300 are coupled to each other by means of housings 400 and 800 provided at front and rear portions thereof, it is preferred to additionally provide a coupling unit 500 over the middle parts of the heat rod assembly 100, the heat pin assembly 200 and the negative terminal 300 in order to reinforce coupling force among the heat rod assembly 100, the heat pin assembly 200 and the negative terminal 300.

As shown in FIG. 3, the coupling unit 500 includes a clip capable of coupling the heat rod assembly 100, the heat pin assembly 200 and the negative terminal 300 with the side frames 600 and 900.

In detail, as shown in FIG. 8 the side frames 600 and 900 have a channel structure, and both ends of the clip are bent such that the both ends of the clip are locked with flanges formed in upper portions of the side frames 600 and 900.

In addition, the housings 400 and 800 have coupling slots 450 and 850, respectively, so as to receive end portions of the side frames 600 and 900. Coupling protrusions 451 and 851 are formed in the coupling slots 450 and 850.

The heat pin assembly 200 is coupled with the side frame 600 by interposing a pin protecting plate 700 made from SUS between the heat pin assembly 200 and the side frame 600 in such a manner that pins are prevented from being deformed when assembling the heat pin assembly 200 or when using the heat pin assembly 200.

INDUSTRIAL APPLICABILITY

As can be seen from the foregoing, according to the present invention, components of the pre-heater, such as the heat rod assembly or the heat pin assembly, can be fabricated as module units, so assembling work and repair work for the pre-heater can be easily carried out, thereby improving productivity.

In addition, since the pre-heater of the present invention can be obtained by assembling module units with each other, the pre-heater of the present invention can be adapted for various kinds of vehicles by changing only a structure of the housings and the clip, without performing additional work.

While this invention has been described in connection with what is presently considered to be the most practical and preferred embodiment, it is to be understood that the invention is not limited to the disclosed embodiment and the drawings, but, on the contrary, it is intended to cover various modifications and variations within the spirit and scope of the appended claims.

The invention claimed is:

1. A heat rod assembly for a pre-heater used in a vehicle, the heat rod assembly comprising:

a channel type lower heat rod;

an insulator installed at a bottom portion of the lower heat rod;

a positive terminal fixedly installed on the insulator lengthwise along the insulator;

a PTC device coupled to the insulator by interposing the positive terminal therebetween; and an upper heat rod for covering an opening section of the lower heat rod;

wherein the insulator is formed with a bottom recess, which extends lengthwise along the insulator in order to receive the positive terminal therein, and wherein the insulator is provided at both longitudinal ends thereof with fixing protrusions, which are inserted into coupling holes formed in the positive terminal.

2. The heat rod assembly as claimed in claim 1, wherein an upper edge section of the lower heat rod is inwardly bent such that the upper edge section covers an edge section of the upper heat rod.

3. The heat rod assembly as claimed in claim 2, wherein an inner width of the lower heat rod is identical to an outer width of the insulator.

4. The heat rod assembly as claimed in claim 1, wherein stepped recesses are formed at both sides of the bottom recess of the insulator, insertion protrusions are formed in the stepped recesses, and a distance between the insertion protrusions is identical to a length of the PTC device.

5. The heat rod assembly as claimed in claim 1, wherein the PTC device is positioned on the insulator corresponding to openings formed in the insulator by interposing the positive terminal between the PTC device and the insulator.

6. A pre-heater for a vehicle, the pre-heater comprising:

a heat rod assembly described in any one of claims 1, 2, 3, 4, and 5;

a heat pin assembly formed at both sides of the heat rod assembly in parallel to each other; a negative terminal aligned in parallel to the heat pin assembly;

side frames coupled to both sides of a coupling structure consisting of the heat rod assembly, the heat pin assembly and the negative terminal; and housings for coupling the heat rod assembly, the heat pin assembly, the negative terminal, and the frames with each other at front and rear portions thereof.

7. The pre-heater as claimed in claim 6, further comprising a coupling unit laterally provided over middle parts of the heat rod assembly, the heat pin assembly and the negative terminal in order to couple the heat rod assembly, the heat pin assembly and the negative terminal with each other.

8. The pre-heater as claimed in claim 7, wherein the coupling unit includes a clip capable of coupling the heat rod assembly, the heat pin assembly and the negative terminal with the side frames.

9. A pre-heater for a vehicle, the pre-heater comprising:

a heat rod assembly comprising:

a channel type lower heat rod;

an insulator installed at a bottom portion of the lower heat rod;

a positive terminal fixedly installed on the insulator lengthwise along the insulator;

a PTC device coupled to the insulator by interposing the positive terminal therebetween; and an upper heat rod for covering an opening section of the lower heat rod;

a heat pin assembly formed at both sides of the heat rod assembly in parallel to each other;

a negative terminal aligned in parallel to the heat pin assembly;

side frames coupled to both sides of a coupling structure consisting of the heat rod assembly, the heat pin assembly and the negative terminal; and housings for coupling the heat rod assembly, the heat pin assembly, the negative terminal, and the frames with each other at front and rear portions thereof;

wherein the coupling unit includes a clip capable of coupling the heat rod assembly, the heat pin assembly and the negative terminal with the side frames; and wherein the side frames have a channel structure, both ends of the clip are bent such that the both ends of the clip are locked with flanges formed in upper portions of the side frames, and the housings have coupling slots, respectively, for receiving end portions of the side frames.

10. A pre-heater for a vehicle, the pre-heater comprising:

a heat rod assembly comprising:

a channel type lower heat rod;

an insulator installed at a bottom portion of the lower heat rod;

a positive terminal fixedly installed on the insulator lengthwise alone the insulator;

a PTC device coupled to the insulator by interposing the positive terminal therebetween; and an upper heat rod for covering an opening section of the lower heat rod;

a heat pin assembly formed at both sides of the heat rod assembly in parallel to each other;

a negative terminal aligned in parallel to the heat pin assembly;

side frames coupled to both sides of a coupling structure consisting of the heat rod assembly, the heat pin assembly and the negative terminal; and housings for coupling the heat rod assembly, the heat pin assembly, the negative terminal, and the frames with each other at front and rear portions thereof;

wherein the heat pin assembly includes a plurality of corrugate pins, which are fixedly arranged lengthwise along a pin plate.

11. A pre-heater for a vehicle, the pre-heater comprising:

a heat rod assembly comprising:

a channel type lower heat rod;

an insulator installed at a bottom portion of the lower heat rod;

a positive terminal fixedly installed on the insulator lengthwise along the insulator;

a PTC device coupled to the insulator by interposing the positive terminal therebetween; and an upper heat rod for covering an opening section of the lower heat rod;

a heat pin assembly formed at both sides of the heat rod assembly in parallel to each other;

a negative terminal aligned in parallel to the heat pin assembly;

side frames coupled to both sides of a coupling structure consisting of the heat rod assembly, the heat pin assembly and the negative terminal; and housings for coupling the heat rod assembly, the heat pin assembly, the negative terminal, and the frames with each other at front and rear portions thereof;

wherein the heat pin assembly is coupled with the side frames by interposing a pin protecting plate therebetween.

* * * * *